(12) United States Patent
Schraer

(10) Patent No.: US 8,297,902 B2
(45) Date of Patent: Oct. 30, 2012

(54) ECCENTRIC ADJUSTMENT ELEMENT

(75) Inventor: Thorsten Schraer, Jetzendorf (DE)

(73) Assignee: Acument GmbH & Co. OHG (DE)

( * ) Notice: Subject to any disclaimer, the term of this patent is extended or adjusted under 35 U.S.C. 154(b) by 56 days.

(21) Appl. No.: 12/677,241

(22) PCT Filed: Sep. 18, 2008

(86) PCT No.: PCT/DE2008/001554
§ 371 (c)(1),
(2), (4) Date: Mar. 9, 2010

(87) PCT Pub. No.: WO2009/039834
PCT Pub. Date: Apr. 2, 2009

(65) Prior Publication Data
US 2010/0180719 A1    Jul. 22, 2010

(30) Foreign Application Priority Data

Sep. 25, 2007    (DE) .................. 20 2007 013 473 U

(51) Int. Cl.
*F16B 23/00*    (2006.01)
(52) U.S. Cl. ........................... 411/398; 411/354
(58) Field of Classification Search .............. 411/398, 411/169, 389, 354; 280/86.754
See application file for complete search history.

(56) References Cited

U.S. PATENT DOCUMENTS

| | | | | |
|---|---|---|---|---|
| 2,525,217 A | * | 10/1950 | Glitsch | 292/256.73 |
| 2,631,866 A | * | 3/1953 | Leighton | 280/86.754 |
| 3,880,444 A | | 4/1975 | Bridges | |
| 7,125,026 B2 | * | 10/2006 | Genick, II | 280/86.753 |
| 2005/0001397 A1 | | 1/2005 | Genick, II | |

FOREIGN PATENT DOCUMENTS

| | | |
|---|---|---|
| DE | 200 12 108 | 1/2002 |
| DE | 202 09 505 | 10/2002 |
| DE | 20 2007 006 410 | 7/2007 |
| EP | 1 216 362 | 1/2002 |
| FR | 2 720 845 | 12/1995 |
| WO | 02/06687 | 1/2002 |
| WO | 2005/052386 | 6/2005 |

OTHER PUBLICATIONS

Search Report received in connection with corresponding German Patent Application No. 20 2007 013 473.8.
International Search Report dated Feb. 5, 2009 which issued in connection with corresponding PCT Application No. PCT/DE2008/001554.
English translation of the International Preliminary Report on Patentability and Written Opinion which issued in connection with corresponding PCT Application No. PCT/DE2008/001554.

* cited by examiner

*Primary Examiner* — Gary Estremsky
(74) *Attorney, Agent, or Firm* — Clark Hill PLC

(57) ABSTRACT

The invention relates to an eccentric adjustment element (10) having a rod (12) provided on both ends with exterior threads (14, 16) of a smaller diameter to each of which unthreaded, inwardly profiled sections (18, 20) are fastened, wherein the shortest distance between a profile and a rotational axis of the rod is greater than the outer radius of the exterior threads (14, 16) and eccentric discs (24, 26) are fitted on each of the profiled sections (18, 20).

2 Claims, 1 Drawing Sheet

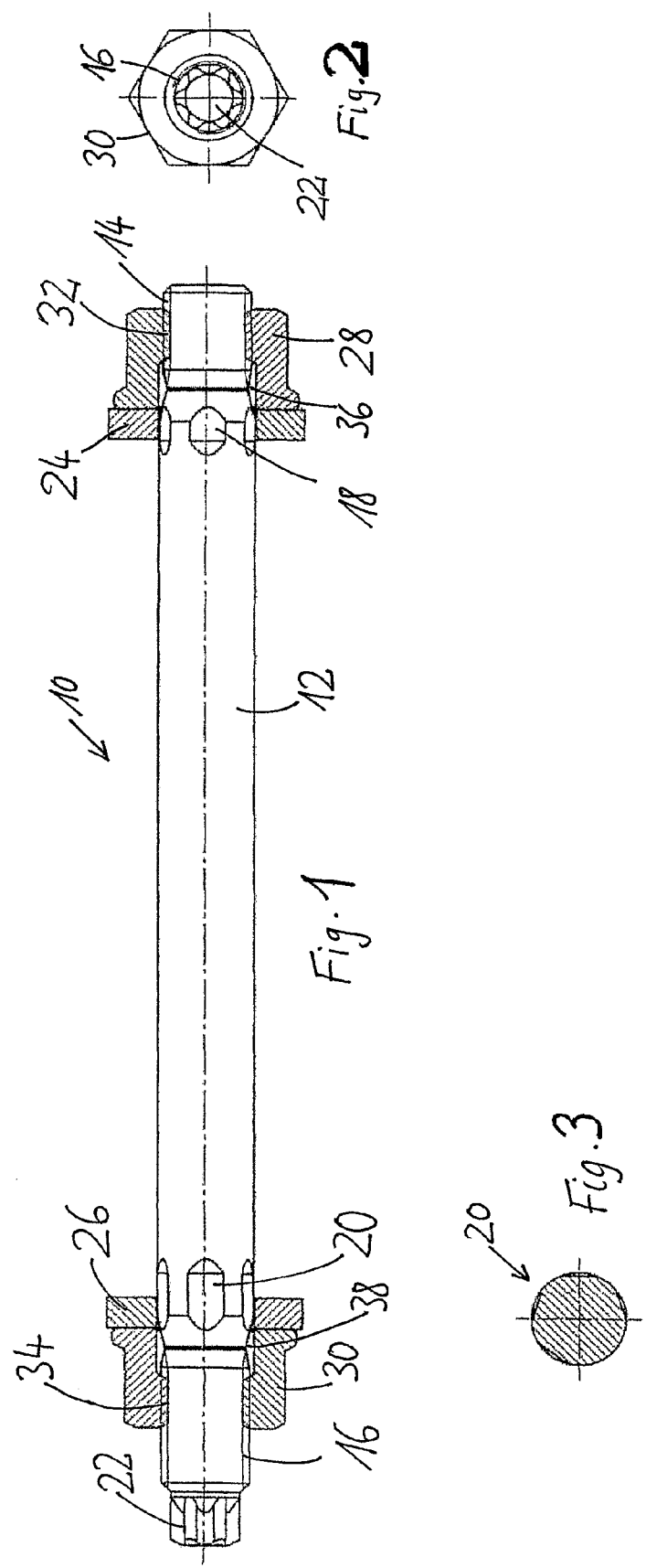

ECCENTRIC ADJUSTMENT ELEMENT

The present invention relates to an eccentric adjustment element. Such adjustment elements for example are used in the construction of motor vehicles to a large extent for adjusting the track. Until now for this purpose exclusively eccenter screws or screw eccenter-disk-combinations had been used. These for example are described in the German Gebrauchsmuster 20 2007 006 410.1 of the applicant.

Further, screw-eccenter-disk-combinations are already known from the FR 2 720 845, the EP 1 216 362 or the DE 200 12 108 U1.

According to this prior art always eccenter adjustment elements had been used which were performed as screw or bolt. The side of the eccenter disk adjacent the screw head in this connection had been manufactured either during the cold-shaping together with the screw head or had been fitted to the screw and had been clamped at the head. This, however, leads to the following disadvantages:

It is extremely difficult to produce corresponding screw heads including the very large eccenter disk by cold-shaping due to the fact that these due to the extremely high necessary grade of cold-shaping might be destroyed during the production.

The only known alternative up to now consisted in clamping a corresponding washer on the shank in the vicinity of the head. Partly this necessitated a continuous design of the profile over the entire shank of the screw. Especially with longer screw-eccenter-disk-combinations this led to a substantial expenditure in manufacture since a large power of deformation was necessary to render the profile to the entire shank of a long screw.

Starting out from this prior art it is therefore the task to be solved by the present invention to provide for an eccentric adjustment element which can be produced far more simple.

According to the invention this task is solved by an eccentric adjustment element which is comprising a rod which is having at its both ends exterior threads with a smaller diameter each followed inwardly by profiled sections, wherein the shortest distance of the profile from a rotational axis of the rod is larger than the exterior radius of the exterior thread and, wherein each eccentric disk is fitted to the profiled sections.

Compared with the screw-eccenter-disk-combinations according to the prior art known up to now this construction has the advantage, too, that the rod during the mounting can be deliberately inserted from each side due to the fact that no head with a larger diameter has to be considered during the mounting.

Only after the mounting of the rod, then the eccentric disks are fitted and possibly the nuts are screwed on from both sides.

The profiles of the rod in this connection can be restricted to small sections adjacent the exterior threads, wherein however alternatively the profile can extend over the entire length of the rod, too. This each can be chosen according to the demands during the manufacture of the rod.

In this connection it is especially preferred to screw nuts onto the exterior thread having an interior thread which is adapted to the exterior threads and which in the direction of the eccentric disks is changing to a bore of a larger diameter which is chosen such that it is larger than the largest diameter of the profiled sections. In this way the eccentric disk can be screwed on over a larger range of the profiled sections by means of the nuts.

To facilitate the mounting, it is further preferred that one end of the rod is provided with a force introduction device preferably an exterior force introduction device. In this way the rod during the screwing on of the nuts can be fixed with a tool such that each nut individually and independent from each other can be screwed on and can be tightened or that one nut can be fixed and the rod can be screwed in by means of the force introduction device.

In the following, the present invention is more detailedly disclosed with reference to the exemplary embodiment shown in the attached drawing.

In the drawings show:

FIG. 1 an eccentric adjustment element according to the invention in a side view (nuts and eccentric disks in section);

FIG. 2 the eccentric adjustment element of FIG. 1 shown in a side view from the side containing the force introduction device;

FIG. 3 a sectional view of the profiled section of the rod according to FIG. 1.

FIG. 1 shows an eccentric adjustment element 10 according to the invention. This comprises a rod 12 which is provided with exterior threads 14, 16 at its two ends. These exterior threads 14, 16 inwardly each are followed by profiled sections 18, 20 of the rod 12. The radius of the exterior threads 14, 16 in this connection always is smaller than the shortest distance of the profiles of the profiled sections 18, 20 with respect to a rotational axis of the rod 12.

At one end, possibly at both ends, too, of the rod 12 beyond the corresponding exterior thread 14 or 16, i.e. at the extreme end of the rod 12 an exterior force introduction device 14 or 16 can be provided. In the exemplary embodiment shown in FIG. 1 the exterior force introduction device 22 is positioned beyond the exterior thread 16. The exterior diameter of the force introduction device 22 in this connection has to be chosen such that it is smaller than the interior diameter of the thread of the corresponding exterior thread 14, 16.

Preferably, an exterior hexagonal or exterior star-shaped force introduction device is used.

Onto the rod designed in this way on both sides corresponding eccentric disks 24, 26 having a correspondingly profiled eccentric bore are fitted. Onto the corresponding exterior threads 16 preferably specially designed nuts 28, 30 are screwed. These merely are having an interior thread 32, 34 over a part of their length. On the respective side of the nuts 28, 30 which after the mounting is facing the eccentric disks 24, 26 the nuts 28, 30 preferably are having a bore provided with a larger interior diameter. This interior diameter preferably is larger than the largest exterior diameter of the profiled sections 18, 20. In this way, the nut at least partly can be screwed over the profiled sections 18, 20 and the eccentric disks 24, 26 can adjusted correspondingly far inwardly on the rod 12.

FIG. 2 is showing the eccentric adjustment element 10 according to the invention of FIG. 1 in a side view from the side containing the force introducing device 22.

As can be learned from this view, the force introducing device is an exterior hexagonal (hexa-globular) force introducing device. Further it can be learned that the nuts are having an exterior force introducing device in the shape of a usual exterior hexagon. In this connection, obviously other exterior force introducing devices are possible, too.

FIG. 3 finally is showing a cross-section through the rod 12 in the area of the profiled section 20. As can be learned from this Figure, here a profile containing several asymmetrically flat portions of the exterior circumference of the rod 12 has been chosen. Self-evidently according to the invention a different profile can be used, too, for example a symmetric profile.

In the exemplary embodiment shown in FIGS. 1 to 3 a mounting of the eccentric adjustment element in difficultly accessible points of the motor vehicle is possible. The eccentric adjustment element according to the invention namely for example can be inserted from one side (the easily accessible side) and then from the difficultly accessible side merely the eccentric disk has to be fitted and thereafter the nut 28 has to be held on the exterior thread 14. In this connection it is sufficient to hold the nut 28 a turning of the nut is not necessary due to the fact that the rod 12 can be screwed into the held nut 28 by means of the exterior force introducing device 22, whereafter the second nut 30 can be screwed on from the more easily accessible side. In this connection, the nut 28 at the difficultly accessible side, too, has to be held only slightly, wherein a correspondingly small tool can be used. Possibly it would be possible, too, if the nut 28 during this mounting step already is not accessible at all, then the rod 12 has to be held by means of the exterior force introducing device 22 while the nut 30 is screwed on from this side.

Apart from the above, the invention enables a maximal flexibility with respect to the production of the eccentric adjustment elements according to the invention since merely rods of different length have to be produced with then according to the demand of the customer are provided with corresponding eccentric disks of different diameters and different eccentricity. This decreases the necessary diversity in connection with the production substantially and facilitates the stock keeping.

The invention claimed is:

1. An eccentric adjustment element comprising: a rod having a longitudinal axis, and having a first section and a second section, exterior threads disposed on said first section and said second section of said rod, said rod having non-threaded, profiled sections disposed between said first section and said second section, wherein the exterior threads are closer to the longitudinal axis of the rod than are the non-threaded profiled sections on the first section and the second section; and eccentric discs which are engaged with the non-threaded, profiled sections of the rod, further comprising nuts which are threadably enagaged with the exterior threads which are disposed on said first section and said second section of said rod, wherein each of the nuts has a bore having an internal diameter which is greater than a diameter of the rod at which the non-threaded, profiled sections are disposed, further comprising an exterior hexagonal or exterior star-shaped force introducing device disposed proximate an end of the rod, wherein the force introducing device is smaller than the interior diameter of the thread of the corresponding exterior thread.

2. An eccentric adjustment element according to claim 1, wherein the force introducing device is configured to receive an exterior force.

* * * * *